United States Patent
Wu et al.

(10) Patent No.: US 9,535,195 B2
(45) Date of Patent: Jan. 3, 2017

(54) COLOR FILM SUBSTRATE AND CURVED DISPLAY DEVICE

(71) Applicant: SHENZHEN CHINA STAR OPTOELECTRONICS TECHNOLOGY CO., LTD., Shenzhen (CN)

(72) Inventors: Chuan Wu, Shenzhen (CN); Shih Hsun Lo, Shenzhen (CN)

(73) Assignee: SHENZHEN CHINA STAR OPTOELECTRONICS TECHNOLOGY., LTD., Shenzhen (CN)

( * ) Notice: Subject to any disclaimer, the term of this patent is extended or adjusted under 35 U.S.C. 154(b) by 19 days.

(21) Appl. No.: 14/416,298

(22) PCT Filed: Dec. 25, 2014

(86) PCT No.: PCT/CN2014/094883
§ 371 (c)(1),
(2) Date: Jan. 22, 2015

(87) PCT Pub. No.: WO2015/196768
PCT Pub. Date: Dec. 30, 2015

(65) Prior Publication Data
US 2015/0378070 A1 Dec. 31, 2015

(30) Foreign Application Priority Data
Jun. 25, 2014 (CN) .......................... 2014 1 0291157

(51) Int. Cl.
*G02B 5/22* (2006.01)
*G02B 5/20* (2006.01)
(Continued)

(52) U.S. Cl.
CPC ......... *G02B 5/201* (2013.01); *G02F 1/133514* (2013.01); *G02F 2001/133388* (2013.01); *G02F 2201/40* (2013.01); *G02F 2201/56* (2013.01)

(58) Field of Classification Search
CPC ............... G02B 5/201; G02F 1/133514; G02F 2001/133388; G02F 2201/40; G02F 2201/56
(Continued)

(56) References Cited

U.S. PATENT DOCUMENTS 7,834,962 B2   11/2010   Satake et al.
2006/0001796 A1   1/2006   Chang et al.
(Continued)

FOREIGN PATENT DOCUMENTS

CN   101201486 A   6/2008
CN   101464582 A   6/2009
(Continued)

OTHER PUBLICATIONS

Office Action issued on Mar. 31, 2016, by the State Intellectual Property Office of China in corresponding Chinese Patent Application No. 201410291157.4. (6 pages).
(Continued)

*Primary Examiner* — Bumsuk Won
*Assistant Examiner* — Collin X Beatty
(74) *Attorney, Agent, or Firm* — Buchanan Ingersoll & Rooney PC

(57) ABSTRACT

In the technical field of display, a color filter substrate and a curved display device, which can solve the technical problem of low aperture ratio of the existing curved display device, are provided. The color substrate comprises a plurality of sub pixel regions arranged as an array, and black matrixes for separating the sub pixel regions from each other. Measured along a transverse direction, the transverse width of each of all or some of the black matrixes located in
(Continued)

Figure 1:
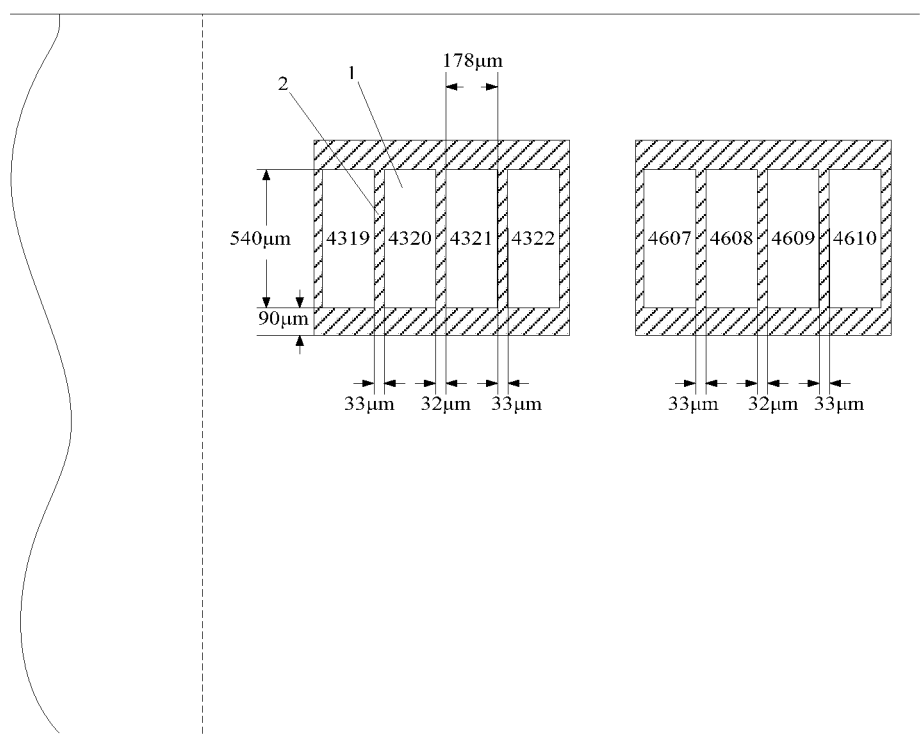

the regions at both sides of the color filter substrate is smaller than that of each of the black matrixes located in the region at the center of the color filter substrate. The present disclosure can be applied to curved display device, such as liquid crystal television and curved liquid crystal display device.

6 Claims, 2 Drawing Sheets

(51) Int. Cl.
*G02F 1/1333* (2006.01)
*G02F 1/1335* (2006.01)

(58) Field of Classification Search
USPC .................................. 359/885–892; 345/419
See application file for complete search history.

(56) References Cited

U.S. PATENT DOCUMENTS

| | | | |
|---|---|---|---|
| 2008/0137013 | A1 | 6/2008 | Kamoshida |
| 2009/0309813 | A1* | 12/2009 | Fujita ................ G02F 1/133512 345/55 |
| 2012/0200562 | A1* | 8/2012 | Kashiwagi ......... G02B 27/2214 345/419 |
| 2013/0215372 | A1* | 8/2013 | Oke ...................... G02F 1/1345 349/149 |

FOREIGN PATENT DOCUMENTS

| | | |
|---|---|---|
| CN | 104076552 A | 10/2014 |
| JP | 2009-229667 A | 10/2009 |
| JP | 2010-008875 A | 1/2010 |

OTHER PUBLICATIONS

International Search Report (PCT/ISA/210) mailed on Mar. 31, 2015, by the Chinese Patent Office as the International Searching Authority for International Application No. PCT/CN2014/094883. (5 pages).

Written Opinion (PCT/ISA/237) mailed on Mar. 31, 2015, by the Chinese Patent Office as the International Searching Authority for International Application No. PCT/CN2014/094883. (4 pages).

\* cited by examiner

COLOR FILM SUBSTRATE AND CURVED DISPLAY DEVICE

The present application claims benefit of Chinese patent application CN 201410291157.4, entitled "COLOR FILTER SUBSTRATE AND CURVED DISPLAY DEVICE" and filed on Jun. 25, 2014, which is incorporated herein by reference.

TECHNICAL FIELD

The present disclosure relates to the technical field of display, and in particular to a color filter substrate and a curved display device.

TECHNICAL BACKGROUND

In a curved display device, because pixels on the screen thereof each can have the same distance from the human eyes, a true visual perception can be perfectly revivified. Thus, the curved display device is more competitive as compared with a traditional flat panel display device.

The process of manufacturing a curved display device comprises the following steps: separately manufacturing an array substrate and a color filter substrate first; then assembling the array substrate and the color filter substrate together to form a planar liquid crystal panel; and further bending the planar liquid crystal panel into an inwardly curved liquid crystal panel. A number of gate lines and data lines that are arranged in a staggered manner with respect to each other, as well as sub pixel regions formed by the gate lines and data lines are arranged on the array substrate. A latticed black matrix and sub pixel regions formed by the black matrix are arranged on the color filter substrate. On the planar liquid crystal panel formed by assembling the array substrate and the color filter substrate, the position of the black matrix on the color filter substrate corresponds to the position of the gate lines and data lines on the array substrate, so that the black matrix can block the gate lines and data lines. The position of the sub pixel area on the color filter substrate corresponds to that on the array substrate, so as to form an aperture region of the curved display device.

However, two curved surfaces having the same shape will be formed respectively on the array substrate and the color filter substrate after the planar liquid crystal panel is bent into a curved one. In this case, both sides of the color filter substrate would displace toward both sides relative to the array substrate. In particular, the black matrix on both sides of the color filter substrate would mismatch with the longitudinal data lines on the array substrate. Some of these data lines would be exposed outside the black matrix, and thus block the sub pixel areas on the color filter substrate, causing a reduced aperture ratio of the curved display device.

SUMMARY OF THE INVENTION

The objective of the present disclosure is to provide a color filter substrate and a curved display device for solving the technical problem of low aperture ratio of the existing curved display device.

The present disclosure provides a color filter substrate, comprising
  a plurality of sub pixel regions arranged as an array, and black matrixes for separating the sub pixel regions from each other,
  wherein measured along a transverse direction, the transverse width of each of all or some of the black matrixes located in regions at both sides of the color filter substrate is smaller than that of each of the black matrixes located in a region at the center of the color filter substrate.

Further, the transverse width of each of the sub pixel regions is the same.

Preferably, the ratio of the area of the regions at both sides of the color filter substrate to the area of the entire color filter substrate is in a range from 50% to 70%.

Preferably, the number of said some of the black matrixes is in a range from 10 to 30.

Preferably, in the region at the center of the color filter substrate, the transverse width of each of the black matrixes is 33 micrometers, and in the regions at both sides of the color filter substrate, the transverse width of each of some black matrixes is 32 micrometers, and that of each of the other black matrixes is 33 micrometers.

In an embodiment of the present disclosure, 5760 columns of sub pixel regions are arranged on the color filter substrate, the transverse width of each sub pixel region being 178 micrometers.

In another embodiment of the present disclosure, 11520 columns of sub pixel regions are arranged on the color filter substrate, the transverse width of each sub pixel region being 72 micrometers.

The present disclosure further provides a curved display device comprising an array substrate and said color filter substrate.

The present disclosure has the following beneficial effects. On the color filter substrate according to the present disclosure, the transverse width of each of all or some of the black matrixes in the regions at both sides is smaller than that of each of the black matrixes in the region at the center, so that the distance between the sub pixel regions in the regions at both sides of the color filter substrate is relatively small, and the sub pixel regions and black matrixes herein displace toward the center of the color filter substrate. After the color filter substrate and the array substrate are assembled together and curved into a curved liquid crystal panel, the displacement of the sub pixel regions and black matrixes toward the center can neutralize the offset of the array substrate toward both sides relative to the color filter substrate, so that the black matrixes on the color filter substrate can be accurately aligned with the data lines on the array substrate and the sub pixel regions on the color filter substrate can be accurately aligned with those on the array substrate, thereby the technical problem of low aperture ratio of the curved display device can be solved.

Other features and advantages of the present disclosure will be further explained in the following description, and are partially become more readily evident therefrom, or be understood through implementing the present disclosure. The objectives and advantages of the present disclosure will be achieved through the structure specifically pointed out in the description, claims, and the accompanying drawings.

BRIEF DESCRIPTION OF THE ACCOMPANYING DRAWINGS

Figure 2:
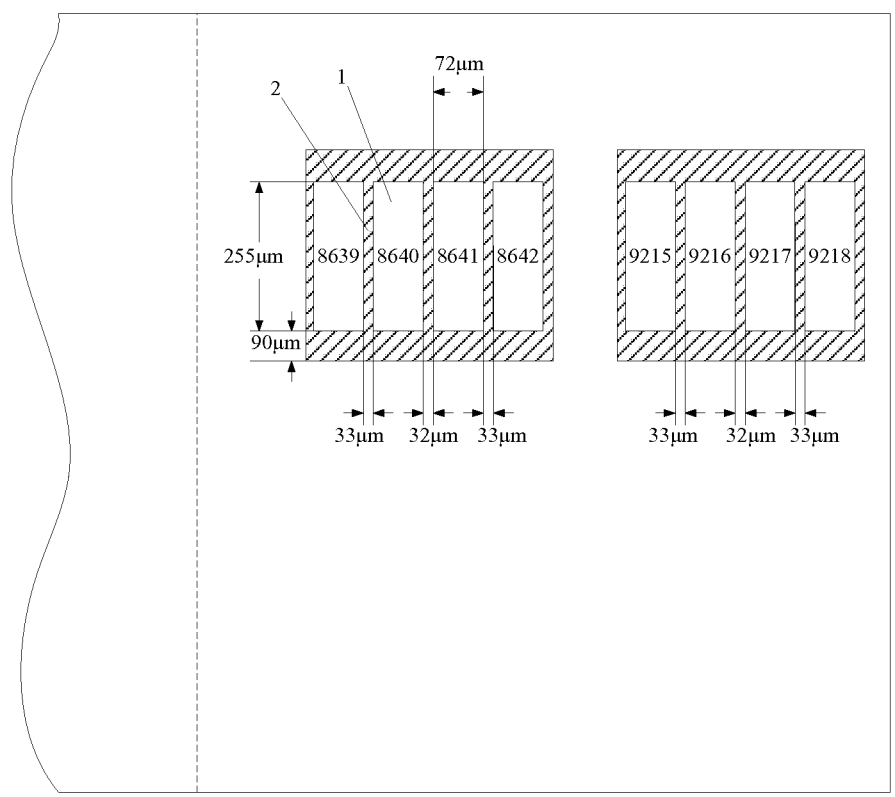

In order to illustrate the technical solutions of the examples of the present disclosure more clearly, the accompanying drawings needed for describing the examples will be explained briefly. In the drawings:

FIG. 1 schematically shows a color filter substrate according to example 1 of the present disclosure, and FIG. 2 schematically shows a color filter substrate according to example 2 of the present disclosure.

DETAILED DESCRIPTION OF THE EMBODIMENTS

The present disclosure will be explained in detail with reference to the embodiments and the accompanying drawings, whereby it can be fully understood about how to solve the technical problem by the technical means according to the present disclosure and achieve the technical effects thereof, and thus the technical solution according to the present disclosure can be implemented. It is important to note that as long as there is no structural conflict, various embodiments as well as the respective technical features mentioned herein may be combined with one another in any manner, and the technical solutions obtained all fall within the scope of the present disclosure.

The color filter substrate provided by the present disclosure comprises a plurality of sub pixel regions arranged as an array, and black matrixes for separating the sub pixel regions from each other. Measured along a transverse direction, the transverse width of each of all or some of the black matrixes located in regions at both sides of the color filter substrate is smaller than that of each of the black matrixes located in a region at the center of the color filter substrate.

On the color filter substrate according to the present disclosure, the transverse width of each of all or some of the black matrixes in the regions at both sides is smaller than that of each of the black matrixes in the region at the center, so that the distance between the sub pixel regions in the regions at both sides of the color filter substrate is relatively small, and the sub pixel regions and black matrixes herein displace toward the center of the color filter substrate. After the color filter substrate and the array substrate are assembled together and curved into a curved liquid crystal panel, the displacement of the sub pixel regions and black matrixes toward the center can neutralize the offset of the array substrate toward both sides relative to the color filter substrate, so that the black matrixes on the color filter substrate can be accurately aligned with the data lines on the array substrate and the sub pixel regions on the color filter substrate can be accurately aligned with those on the array substrate, thereby the technical problem of low aperture ratio of the curved display device can be solved.

EXAMPLE 1

The present example takes a color filter substrate in a 55-inch full high definition (hereinafter referred to as FHD) curved liquid crystal television as an example. The resolution of the FHD television is 1920×1080, i.e., the television comprises altogether 1080 lines and 1920 columns of pixel regions. Each pixel region comprises three sub pixel regions arranged in parallel. Thus, there are altogether 5760 columns of sub pixel regions arranged on the color filter substrate.

The transverse width of each of all or some of the black matrixes located in the regions at both sides of the color filter substrate is smaller than that of each of the black matrixes located in the region at the center of the color filter substrate. The ratio of the area of the regions at both sides of the color filter substrate to the area of the entire color filter substrate is in a range from 50% to 70%. In the prior art, due to the mismatch between the black matrixes and the data lines, the aperture ratio in the regions at both sides, which accounts for 50% to 70% of the area of the entire curved display device, would decrease, while that in the region at the center, which accounts for 30% to 50% of the entire display device, would not be influenced. Therefore, in the example of the present disclosure, only the transverse widths of the black matrixes located in the regions at both sides of the color filter substrate, which account for 50% to 70% of the area of the entire color filter substrate, are configured to be reduced, thereby the sub pixel regions and black matrixes therein displace toward the center of the color filter substrate.

Specifically, the transverse widths of all the black matrixes in the regions at both sides of the color filter substrate can be reduced, or those of some of said black matrixes can be reduced, as long as the total amount of reduction of the sub pixel regions and the black matrixes equals to the amount of offset of the color filter substrate toward both sides relative to the array substrate when being bended. Of course, in practical operation, certain error is allowed between the amount of reduction and that of offset.

When the color filter substrate is bended, the amount of offset of the color filter substrate toward both sides relative to the array substrate is usually in a range from 10 to 30 micrometers. In this example, in the regions at both sides of the color filter substrate, there are 10 to 30 black matrixes each having a smaller transverse width than each of the black matrixes in the region at the center of the color filter substrate. That is, only the transverse widths of 10 to 30 black matrixes each are reduced for 1 micrometer, so that the total amount of reduction equals to the amount of offset.

Preferably, the transverse width of each of the sub pixel regions on the color filter substrate is the same, so that the black matrixes on the color filter substrate can be accurately aligned with the data lines on the array substrate. And after the sub pixel regions on the color filter substrate are accurately aligned with those on the array substrate, each sub pixel region can have the same aperture ratio, thereby the aperture ratio throughout the curved display device can be uniform.

As shown in FIG. 1, the present example provides a color filter substrate for a 55-inch full high definition liquid crystal television, on which 5760 columns of sub pixel regions 1 are arranged. FIG. 1 only schematically shows the right half of the color filter substrate. In the region at the center of the color filter substrate, the transverse width of each of the black matrixes 2 is 33 micrometers; and in the regions at both sides thereof, the transverse width of each of 10 black matrixes 2 is 32 micrometers. That is, the region at the right side of the color filter substrate and the region at the left side thereof each comprise 5 black matrixes 2 each having a transverse width of 32 micrometers, and the other black matrixes 2 in the regions at both sides each have a transverse width of 33 micrometers. In this example, the areas of the regions at both sides together account for 50% of that of the entire color filter substrate, wherein the region at the right side of the color filter substrate and that at the left side thereof each account for 25% of the entire color filter substrate. That is, the region at the left side of the color filter substrate and that at the right side thereof each comprise 1440 columns of sub pixel regions 1 and 1440 black matrixes 2.

In a preferred solution, 5 black matrixes 2 each having a transverse width of 32 micrometers are uniformly distributed in the 1440 black matrixes in each of the region at the right side of the color filter substrate and that at the left side thereof. Specifically, as shown in FIG. 1, the transverse width of the black matrix 2 between the sub pixel region of the $4320^{th}$ column and the sub pixel region of the $4321^{st}$ column is 32 micrometers, and that of each of the two black matrixes 2 adjacent thereto is 33 micrometers. To the right side of the abovementioned black matrix 2, the transverse width of the black matrix 2 between the sub pixel region of the 4608$^{th}$ column and the sub pixel region of the 4609$^{th}$ column is 32 micrometers, and that of each of the two black matrixes 2 adjacent thereto is 33 micrometers. In a similar fashion, every one black matrix 2 in each 288 black matrixes 2 has a transverse width of 32 micrometers, and other black matrixes 2 herein each have a transverse width of 33 micrometers.

On the color filter substrate according to the present example, the sub pixel regions 1 and black matrixes 2 at both sides displace toward the center for 10 micrometers. After the color filter substrate and the array substrate are assembled together and curved into a curved liquid crystal panel, the displacement of the sub pixel regions 1 and black matrixes 2 toward the center can neutralize the offset of the color filter substrate toward both sides relative to the array substrate, so that the black matrixes 2 on the color filter substrate can be accurately aligned with the data lines on the array substrate, and the sub pixel regions 1 on the color filter substrate can be accurately aligned with those on the array substrate, thereby the technical problem of low aperture ratio of the curved display device can be solved.

Furthermore, the longitudinal width of each of the black matrixes on the color filter substrate is 90 micrometers. The transverse width of each of the sub pixel regions is 178 micrometers, and the longitudinal height of each of the sub pixel regions is 540 micrometers. The total width of the color substrate is about 1220 millimeter, and the total height thereof is about 680 millimeter.

In other embodiments, the reduced amount of the transverse width of each black matrix can be increased or decreased. For example, the transverse width of a black matrix after reduction can be 32.5 micrometers, and the transverse width of each of the other black matrixes is 33 micrometers. In the meantime, the number of reduced black matrixes should be decreased or increased accordingly.

EXAMPLE 2

This example is substantially the same as example 1. The difference of this example therefrom is that a color filter substrate in a 55-inch ultra high definition (hereinafter referred to as UHD) curved liquid crystal television is provided. The resolution of the UHD television is 3840×2160, i.e., the television comprises altogether 2160 lines and 3840 columns of pixel regions. Each pixel region comprises three sub pixel regions arranged in parallel. Thus, 11520 columns of sub pixel regions are arranged on the color filter substrate.

As shown in FIG. 2, in the present example, 5 black matrixes each having a transverse width of 32 micrometers are uniformly distributed in the 2880 black matrixes 2 in each of the region at the left side of the color filter substrate and that at the right side thereof, and the other black matrixes 2 (including black matrixes in the region at the center and those in the regions at both sides of the color filter substrate) each having a transverse width of 33 micrometers. FIG. 2 only shows the right half of the color filter substrate. The transverse width of the black matrix 2 between the sub pixel region of the 8640$^{th}$ column and that of the 8641$^{st}$ column is 32 micrometers, and the two black matrixes adjacent thereto each have a transverse width of 33 micrometers. To the right side of the abovementioned black matrix 2, the transverse width of the black matrix 2 between the sub pixel region of the 9216$^{th}$ column and that of the 9217$^{th}$ column is 32 micrometers, and the two black matrixes 2 adjacent thereto each have a transverse width of 33 micrometers. In a similar fashion, every one black matrix 2 in each 576 black matrixes 2 has a transverse width of 32 micrometers, and the other black matrixes 2 each have a transverse width of 33 micrometers.

On the color filter substrate according to the present example, the sub pixel regions 1 and black matrixes 2 at both sides displace toward the center of the color filter substrate for 10 micrometers. After the color filter substrate and the array substrate are assembled together and curved into a curved liquid crystal panel, the displacement of the sub pixel regions 1 and black matrixes 2 toward the center can neutralize the offset of the color filter substrate toward both sides relative to the array substrate, so that the black matrixes 2 on the color filter substrate can be accurately aligned with the data lines on the array substrate and the sub pixel regions 1 on the color filter substrate can be accurately aligned with those on the array substrate, thereby the technical problem of low aperture ratio of the curved display device can be solved.

In addition, the longitudinal width of each of the black matrixes on the color filter substrate is 90 micrometers. The transverse width of each of the sub pixel regions is 72 micrometers, and the longitudinal height of each of the sub pixel regions is 225 micrometers. The total width of the color substrate is about 1220 millimeter, and the total height thereof is about 680 millimeter.

EXAMPLE 3

The example of the present disclosure provides a curved display device, which can be a 55-inch full high definition curved liquid crystal television. The curved display device comprises an array substrate, and the color filter substrate according to example 1 of the present disclosure.

Alternatively, the curved display device can also be a 55-inch ultra high definition curved liquid crystal television, comprising an array substrate and the color filter substrate according to example 2 of the present disclosure.

Of course, the curved display device can also be a curved liquid crystal television of other size and model, or other types of curved display device.

The curved display device according to the present example has the same technical features as the color filter substrate of example 1 or that of example 2, and thus can solve the same technical problem and achieve the same technical effects.

The above embodiments are described only for better understanding, rather than restricting, the present disclosure. Any person skilled in the art can make amendments to the implementing forms or details without departing from the spirit and scope of the present disclosure. The scope of the present disclosure should still be subjected to the scope defined in the claims.

The invention claimed is:

1. A curved display device, comprising an array substrate and a color filter substrate, wherein the color filter substrate comprises a plurality of sub pixel regions arranged as an array, and black matrixes for separating the sub pixel regions from each other, wherein measured along a transverse direction, the transverse width of each of all or some of the black matrixes located in the regions at both sides of the color filter substrate is smaller than that of each of the black matrixes located in the region at the center of the color filter substrate, wherein the transverse width of each of the sub pixel regions is the same such that the aperture ratio throughout the curved display device is uniform.

2. The curved display device according to claim 1, wherein the ratio of the total area of the regions at both sides of the color filter substrate to the area of the entire color filter substrate is in a range from 50% to 70%.

3. The curved display device according to claim 1, wherein the number of said some of the black matrixes is in a range from 10 to 30.

4. The curved display device according to claim 1, wherein in the region at the center of the color filter substrate, the transverse width of each of the black matrixes is 33 micrometers, and in the regions at both sides of the color filter substrate, the transverse width of each of some black matrixes is 32 micrometers, and that of each of the other black matrixes is 33 micrometers.

5. The curved display device according to claim 4, wherein 5760 columns of sub pixel regions are arranged on the color filter substrate, the transverse width of each sub pixel region being 178 micrometers.

6. The curved display device according to claim 4, wherein 11520 columns of sub pixel regions are arranged on the color filter substrate, the transverse width of each sub pixel regions being 72 micrometers.

\* \* \* \* \*